United States Patent
Suyama et al.

(10) Patent No.: US 9,874,685 B2
(45) Date of Patent: Jan. 23, 2018

(54) COATED OPTICAL FIBER AND METHOD FOR MANUFACTURING COATED OPTICAL FIBER

(71) Applicant: FURUKAWA ELECTRIC CO., LTD., Tokyo (JP)

(72) Inventors: Kenichi Suyama, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/583,399

(22) Filed: May 1, 2017

(65) Prior Publication Data

US 2017/0248756 A1 Aug. 31, 2017

Related U.S. Application Data

(63) Continuation of application No. PCT/JP2015/005420, filed on Oct. 28, 2015.
(Continued)

(30) Foreign Application Priority Data

Mar. 24, 2015 (JP) ................................. 2015-061464

(51) Int. Cl.
*G02B 6/36* (2006.01)
*G02B 6/00* (2006.01)
(Continued)

(52) U.S. Cl.
CPC ...... *G02B 6/02395* (2013.01); *C03C 25/1065* (2013.01)

(58) Field of Classification Search
CPC ............... G02B 6/036; G02B 6/02033; G02B 6/02395; C03C 25/104; C03C 25/102; C03C 25/1065
(Continued)

(56) References Cited

U.S. PATENT DOCUMENTS 5,534,101 A * 7/1996 Keyworth ............... B29C 41/22
156/244.12
2003/0063882 A1 4/2003 Bishop et al.
(Continued)

FOREIGN PATENT DOCUMENTS

JP 1-166011 6/1989
JP 7-104155 4/1995
(Continued)

OTHER PUBLICATIONS

International Search Report dated Feb. 2, 2016 in PCT/JP2015/005420, filed on Oct. 28, 2015 (with English Translation).
(Continued)

*Primary Examiner* — Kaveh C Kianni
*Assistant Examiner* — Hung Lam
(74) *Attorney, Agent, or Firm* — Oblon, McClelland, Maier & Neustadt, L.L.P.

(57) ABSTRACT

A coated optical fiber, including a coating layer with a high elastic modulus even when a glass optical fiber is coated with resin by using an ultraviolet semiconductor light emitting element as a light source for curing resin and using a Wet-on-Wet method, is provided. A manufacturing method of the coated optical fiber includes: applying a first ultraviolet curable resin to a glass optical fiber; applying a second ultraviolet curable resin to the periphery of the first ultraviolet curable resin before curing the first ultraviolet curable resin; and irradiating the first and second ultraviolet curable resins with light in a wavelength range of 350 to 405 nm emitted from an ultraviolet semiconductor light emitting element, wherein the second ultraviolet curable resin contains a photopolymerization initiator that absorbs the light from the ultraviolet semiconductor light emitting element to generate radicals, and the photopolymerization initiator has photobleaching properties.

5 Claims, 7 Drawing Sheets

Related U.S. Application Data (60) Provisional application No. 62/077,005, filed on Nov. 7, 2014.

(51) Int. Cl.
*G02B 6/02* (2006.01)
*C03C 25/10* (2006.01)

(58) Field of Classification Search
USPC .......................................... 385/128, 142, 144
See application file for complete search history.

(56) References Cited

U.S. PATENT DOCUMENTS

| | | |
|---|---|---|
| 2003/0169989 A1 | 9/2003 | Abel et al. |
| 2012/0196122 A1 | 8/2012 | Bishop et al. |
| 2013/0258481 A1* | 10/2013 | Fukuda .................. C09D 5/006 359/601 |

FOREIGN PATENT DOCUMENTS

| | | |
|---|---|---|
| JP | 11-116282 | 4/1999 |
| JP | 2003-530294 | 10/2003 |
| JP | 2004-501403 | 1/2004 |
| JP | 2010-117531 | 5/2010 |
| JP | 2011-256331 | 12/2011 |
| JP | 2013-512856 | 4/2013 |

OTHER PUBLICATIONS

Written Opinion dated Feb. 2, 2016 in PCT/JP2015/005420, filed on Oct. 28, 2015.

\* cited by examiner

SECONDARY LAYER

PRIMARY LAYER

FIG. 5

SECONDARY LAYER

PRIMARY LAYER

SECONDARY LAYER

--- 0s
--- 10s
— 30s

PRIMARY LAYER

COATED OPTICAL FIBER AND METHOD FOR MANUFACTURING COATED OPTICAL FIBER

CROSS-REFERENCES TO RELATED APPLICATIONS

This application is a continuation application of International Application No. PCT/JP2015/005420, filed Oct. 28, 2015, which claims the benefit of U.S. Patent Application No. 62/077,005 filed Nov. 7, 2014 and Japanese Patent Application No. 2015-061464 filed Mar. 24, 2015. The contents of the aforementioned applications are incorporated herein by reference in their entireties.

TECHNICAL FIELD

The present invention relates to a coated optical fiber coated with a primary layer and a secondary layer, and a method for manufacturing a coated optical fiber.

BACKGROUND ART

A coated optical fiber is generally manufactured by coating the surface of a glass optical fiber pulled from a preform (also referred to as the optical fiber base material) with resin. The coating is formed by first applying ultraviolet curable resin to the periphery of the glass optical fiber and then curing the ultraviolet curable resin by ultraviolet (UV light) irradiation. The ultraviolet curable resin is also used in various industrial fields other than the optical fiber coating. The ultraviolet curable resin is also used, for example, for curing paint or printing ink and for protective coating of various products including electronic circuits. Generally, the ultraviolet curable resin is efficiently cured in a short time by irradiation of ultraviolet light having a wavelength of about 200 nm to 400 nm.

A high-pressure mercury lamp or a metal halide lamp (hereinafter described as the high-pressure mercury lamp or the like) has heretofore been used as a light source of UV light in an optical fiber coating and curing apparatus (coated optical fiber manufacturing apparatus). The high-pressure mercury lamp has high-purity mercury (Hg) and a small amount of noble gas sealed in a luminous tube made of quartz glass. The high-pressure mercury lamp has a main wavelength of 365 nm, and efficiently emits ultraviolet light of 254 nm, 303 nm, and 313 nm. Meanwhile, the metal halide lamp similarly used has metal sealed in the form of halide in addition to mercury in a luminous tube, and emits an ultraviolet spectrum over a wide range from 200 nm to 450 nm.

As a method for coating a glass optical fiber with ultraviolet curable resin, a Wet-on-Wet method and a Wet-on-Dry method are known. The Wet-on-Wet method is a method in which multiple ultraviolet curable resin layers are cured all at once by single ultraviolet irradiation after the ultraviolet curable resin layers are applied onto a glass optical fiber. On the other hand, the Wet-on-Dry method is a method in which a single ultraviolet resin layer is applied onto a glass optical fiber and then cured by ultraviolet irradiation, and ultraviolet resin layer application and ultraviolet irradiation are further performed thereon.

In the Wet-on-Wet method used in a manufacturing process of an optical fiber, in which multiple resins are applied and then cured, multiple coating layers are efficiently cured with the ultraviolet light having a wavelength of about 200 nm to 400 nm described above. Therefore, for example, a photopolymerization initiator that absorbs ultraviolet light of about 200 nm to 350 nm is added to the upper secondary layer, and a photopolymerization initiator that absorbs ultraviolet light of about 200 nm to 350 nm and 350 nm or more is added to the lower primary layer. Thus, the respective coating layers sufficiently absorb ultraviolet light and are cured by ultraviolet irradiation using the high-pressure mercury lamp or the like described above.

To reduce power consumption in curing the ultraviolet curable resin, there has recently been an attempt to use an ultraviolet semiconductor light emitting element such as an ultraviolet laser diode (UV-LD) or an ultraviolet light emitting diode (UV-LED) as a UV light source, instead of the conventionally used high-pressure mercury lamp or the like.

For example, Patent Document 1 discloses an ultraviolet irradiation device including an ultraviolet irradiation unit including a light guide path capable of emitting ultraviolet light from the side and a semiconductor light emitting element that is an ultraviolet light source. With this device, the ultraviolet light introduced into the light guide path can be linearly emitted to a coating resin from the side of the light guide path. Thus, a sufficient cumulative amount of light can be obtained even when a small number of ultraviolet light sources are used. As a result, curability of the coating resin and the life of the device can be improved.

Moreover, Patent Document 2 discloses a method for improving curability of a coating resin in a case where a semiconductor light emitting element with a single wavelength is used as a resin curing light source, as compared with a high-pressure mercury lamp having a wide wavelength range, and the like, the method including using a coating resin obtained by adding a photopolymerization initiator having an absorption region at an emitted light wavelength of the semiconductor light emitting element to an ultraviolet curable resin composition.

CITATION LIST

Patent Document

Patent Document 1: Japanese Patent Application Laid-Open No. 2010-117531
Patent Document 2: Japanese Patent Application Laid-Open No. 2011-256331

SUMMARY OF INVENTION

However, when a semiconductor light emitting element is used as a light source in the Wet-on-Wet method in which multiple ultraviolet curable resin layers are applied and then cured all at once, it is found that a coating layer having the same level of elastic modulus (Young's modulus) cannot sometimes be obtained by curing the ultraviolet curable resin to the same level as that when a high-pressure mercury lamp or the like is used, even with the use of the ultraviolet curable resin containing the photopolymerization initiator having the absorption region at the emitted light wavelength of the ultraviolet semiconductor light emitting element as in Patent Document 2.

When a semiconductor light emitting element such as an LED is used as a light source instead of the conventional light source such as the high-pressure mercury lamp, curing multiple layers including the primary layer and the secondary layer requires irradiation with ultraviolet light in at least two wavelength ranges of 200 nm to 350 nm and 350 nm or more.

However, as for a light source of a high-output semiconductor light emitting element currently in the market, output of 1000 mW/cm² or more can be expected in a wavelength range of 365 nm to 405 nm. On the other hand, a semiconductor light emitting element that outputs ultraviolet light in a deep ultraviolet range of 200 nm to 350 nm, and that is currently in the market, has an output of 1 mW/cm² to 10 mW/cm², which is much lower than that of the light source of the semiconductor light emitting element that outputs a wavelength of 365 nm or more. Therefore, it is difficult, with general semiconductor light emitting elements, to irradiate optical fiber coating resin with ultraviolet light having sufficient output to cure the optical fiber coating resin in at least two wavelength ranges of 200 nm to 350 nm and 350 nm or more.

Therefore, it is an object of the present invention to provide a coated optical fiber and a method for manufacturing a coated optical fiber, the coated optical fiber including a coating layer with a high elastic modulus even when a glass optical fiber is coated with resin by using an ultraviolet semiconductor light emitting element as a light source for curing resin and using a Wet-on-Wet method.

A method for manufacturing a coated optical fiber according to one aspect of the present invention is a method for manufacturing a coated optical fiber including a glass optical fiber, a primary layer covering the glass optical fiber, and a secondary layer covering the primary layer, including the steps of: applying a first ultraviolet curable resin to the glass optical fiber; applying a second ultraviolet curable resin to the periphery of the first ultraviolet curable resin before curing the first ultraviolet curable resin; and forming the primary layer and the secondary layer by irradiating the first ultraviolet curable resin and the second ultraviolet curable resin with light in a wavelength range of 350 nm to 405 nm emitted from an ultraviolet semiconductor light emitting element, wherein the second ultraviolet curable resin contains a photopolymerization initiator that absorbs the light from the ultraviolet semiconductor light emitting element to generate radicals, and the photopolymerization initiator has photobleaching properties.

A coated optical fiber according to one aspect of the present invention includes: a glass optical fiber; a primary layer covering the glass optical fiber; and a secondary layer covering the primary layer, wherein the secondary layer is formed by irradiating ultraviolet curable resin with light in a wavelength range of 350 nm to 405 nm emitted from an ultraviolet semiconductor light emitting element, the ultraviolet curable resin containing a photopolymerization initiator that absorbs the light from the ultraviolet semiconductor light emitting element to generate radicals, the photopolymerization initiator has photobleaching properties, the primary layer has an elastic modulus of 0.2 MPa or more but 3.0 MPa or less, and the secondary layer has an elastic modulus of 500 MPa or more but 2500 MPa or less.

According to the present invention, a large amount of ultraviolet light can reach not only the second ultraviolet curable resin but also the first ultraviolet curable resin since the second ultraviolet curable resin covering the periphery of the first ultraviolet curable resin contains a photopolymerization initiator with photobleaching properties. Thus, the curability of both of the first and second ultraviolet curable resins can be improved even with the Wet-on-Wet method in which the ultraviolet light is irradiated in an uncured state of the first and second ultraviolet curable resins.

BRIEF DESCRIPTION OF DRAWINGS

FIG. 4 is a view showing graphs schematically illustrating changes in amount of ultraviolet light from a high-pressure mercury lamp or the like.

DESCRIPTION OF EMBODIMENTS

With reference to the drawings, an embodiment of the present invention is described below. However, the present invention is not limited to this embodiment. Note that, in the drawings described below, elements having the same functions are denoted by the same reference numerals, and repeated description thereof may be omitted.

(Embodiment)

Figure 1:
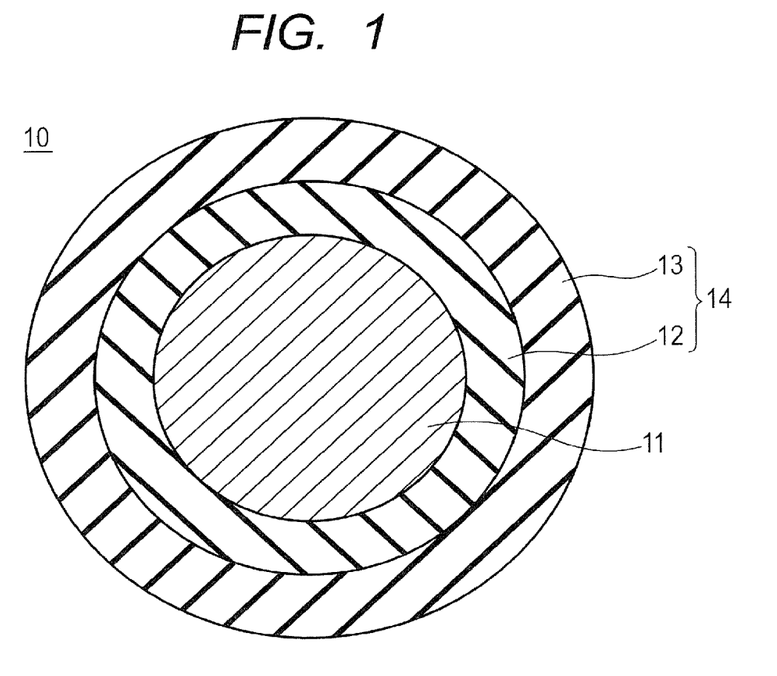
FIG. 1 is a schematic cross-sectional view showing an embodiment of a coated optical fiber according to the present invention.

FIG. 1 is a schematic cross-sectional view showing a coated optical fiber according to this embodiment. As shown in FIG. 1, a coated optical fiber 10 includes a glass optical fiber 11 and a double-layered coating layer 14 including a soft primary layer 12 and a hard secondary layer 13 covering the periphery of the glass optical fiber 11. The primary layer 12 and the secondary layer 13 are made of coating resin obtained by curing ultraviolet curable resin by ultraviolet irradiation, and have a function to protect the glass optical fiber 11. The configuration of the coated optical fiber 10 is not limited to the above configuration. The coating layer 14 may include three or more layers, and may have its periphery further covered with a colored layer, a bundle coating layer that bundles multiple coated optical fibers 10, or the like.

The glass optical fiber 11 has a diameter of generally 100 µm to 150 µm, and typically 124 µm to 126 µm. The primary layer 12 has a thickness of generally 10 µm to 50 µm, and also the secondary layer 13 has a thickness of generally 10 µm to 50 µm. Moreover, the diameter of the coated optical fiber 10 (that is, the outside diameter of the secondary layer 13) is generally 245 µm to 255 µm.

As for the ultraviolet curable resin used as the coating resin of the optical fiber, for example, ultraviolet curable resin with at least two ethylene unsaturated groups which are polymerized or cured by ultraviolet light is used, and oligomer is preferably used. Note that oligomer here is a polymer with a degree of polymerization of 2 to 100. Also, the ultraviolet curable resin contains a photopolymerization initiator with a predetermined property to be described later.

The ultraviolet curable resin may contain a diluent monomer, a photosensitizer, a silane coupling agent, a chain transfer agent, and various kinds of additives, in addition to the oligomer and the photopolymerization initiator. As the diluent monomer, a monofunctional (meth)acrylate or a polyfunctional (meth)acrylate is used. The diluent monomer means a monomer for diluting the ultraviolet curable resin.

Figure 2:
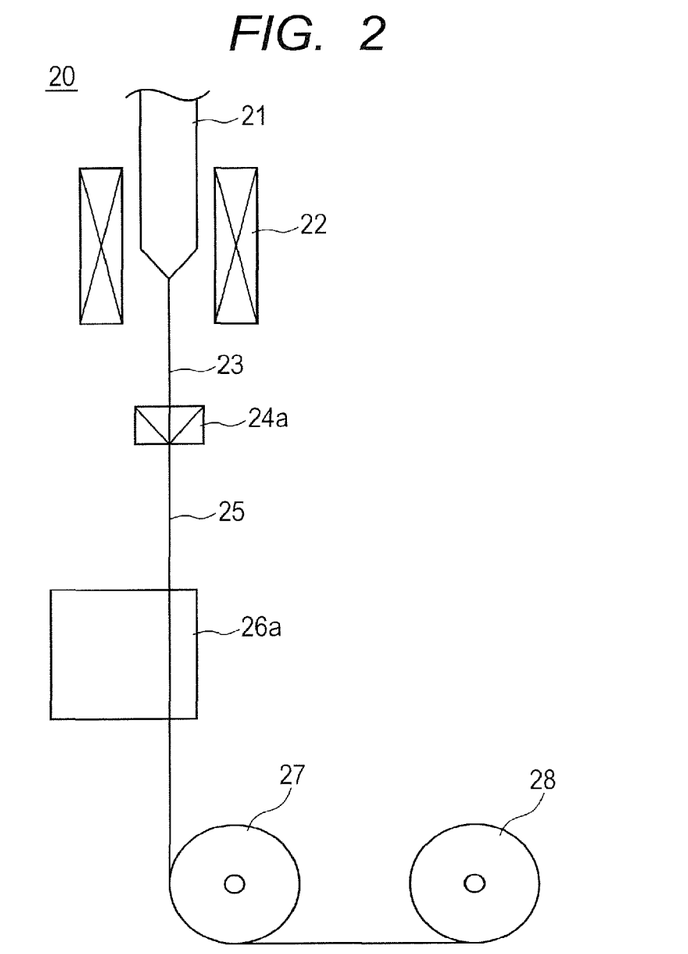
FIG. 2 is a schematic view showing a manufacturing apparatus used for a method for manufacturing a coated optical fiber according to the embodiment of the present invention.

FIG. 2 is a schematic view showing a manufacturing apparatus 20 used for a method for manufacturing a coated optical fiber according to this embodiment. The manufacturing apparatus 20 is an apparatus for manufacturing a coated optical fiber using a Wet-on-Wet method.

An optical fiber base material 21 is made of quartz glass, for example, and is manufactured using a well-known method such as a VAD method, an OVD method, and a CVD method. An end of the optical fiber base material 21 is heated and melted by a heater 22 disposed around the optical fiber base material 21, and is then drawn and pulled as a glass optical fiber 23 (that is, the glass optical fiber 11 in FIG. 1).

Below the heater 22, a resin application device 24a is provided to apply the ultraviolet curable resin to the periphery of the glass optical fiber 23. The resin application device 24a separately holds an ultraviolet curable resin for the primary layer 12 (also referred to as the primary ultraviolet curable resin) and an ultraviolet curable resin for the secondary layer 13 (also referred to as the secondary ultraviolet curable resin). The resin application device 24a applies the primary ultraviolet curable resin and the secondary ultraviolet curable resin all at once to the glass optical fiber 23 pulled out of the optical fiber base material 21.

Below the resin application device 24a, an ultraviolet irradiation unit 26a is provided to irradiate ultraviolet light to a glass optical fiber 25 coated with the primary ultraviolet curable resin and the secondary ultraviolet curable resin. The glass optical fiber 25 with the ultraviolet curable resin applied thereto by the resin application device 24a enters the ultraviolet irradiation unit 26a and is irradiated with ultraviolet light emitted from a semiconductor light emitting element. As a result, the double-layered ultraviolet curable resin covering the periphery of the glass optical fiber 25 is cured, and the double-layered ultraviolet curable resin turns into the primary layer 12 and the secondary layer 13.

The glass optical fiber with the primary and secondary layers 12 and 13 formed on its periphery (that is, the coated optical fiber 10) is guided by a guide roller 27 and wound up by a winding unit 28.

The ultraviolet irradiation unit 26a includes one or more semiconductor light emitting elements, which output ultraviolet light in a narrow wavelength range with a peak wavelength of 300 nm to 405 nm, for example. From the viewpoints of rapid curing and reduction in thermal damage on the resin, an irradiation energy is preferably 10 mJ/cm$^2$ to 3000 mJ/cm$^2$, and more preferably 30 mJ/cm$^2$ to 1500 mJ/cm$^2$. The semiconductor light emitting element(s) is (are) electrically connected to a controller (not shown), which controls the output thereof. While a light emitting diode (LED) is used as the semiconductor light emitting element in this embodiment, any light emitting element, for example, a semiconductor laser or the like may be used, which can output ultraviolet light having a predetermined wavelength by means of a semiconductor.

Here, description is given of a relationship between ultraviolet light irradiated to the coating resin and the photopolymerization initiator by comparing the conventional technology to the invention according to this embodiment.

When a high-pressure mercury lamp or the like is used as a ultraviolet light source as in a conventional coated optical fiber manufacturing apparatus, the high-pressure mercury lamp or the like has more than one peak wavelength in an ultraviolet region, and thus outputs ultraviolet light in a broad wavelength range. Therefore, even if absorption wavelengths of the photopolymerization initiators in the primary layer 12 and the secondary layer 13 partially overlap, both of the primary layer 12 and the secondary layer 13 can be sufficiently cured by using a photopolymerization initiator with a shifted absorption wavelength region between the primary layer 12 and the secondary layer 13 (for example, the absorption wavelength of the photopolymerization initiator in the primary layer 12 is on the longer wavelength side of that of the secondary layer 13).

Figure 4:
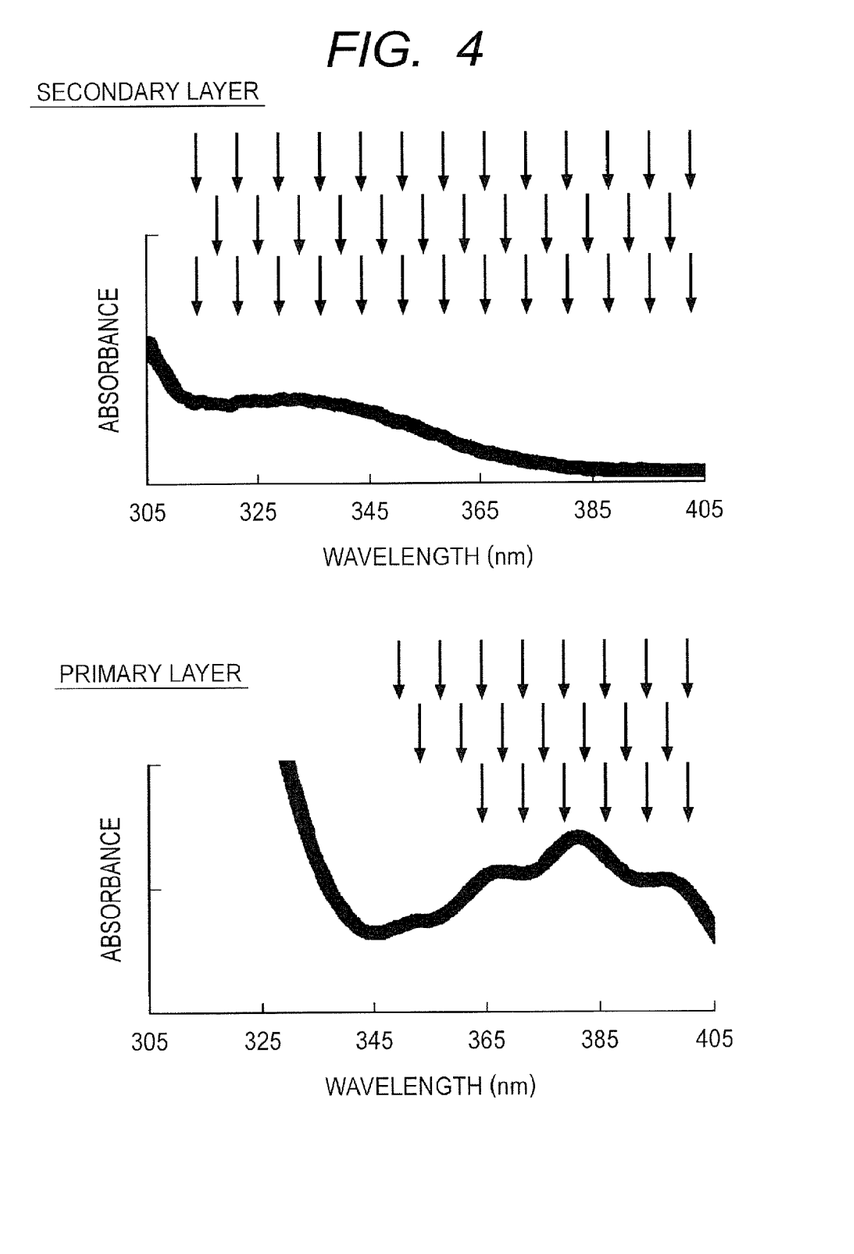

FIG. 4 is a view showing graphs schematically illustrating changes in amount of light when irradiating the ultraviolet curable resin with ultraviolet light from the high-pressure mercury lamp or the like. The ultraviolet curable resin in FIG. 4 is obtained by combining the outer secondary layer 13 with less absorption on the longer wavelength side and the inner primary layer 12 with absorption on the longer wavelength side. The upper graph of FIG. 4 shows the absorbance of the secondary layer 13, while the lower graph of FIG. 4 shows the absorbance of the primary layer 12. In each graph, the horizontal axis represents the wavelength (nm) and the vertical axis represents the absorbance (no unit of quantity required). In each graph, the ultraviolet light from the ultraviolet light source is indicated by arrows. The larger the number of the arrows, the larger the amount of light (light intensity).

As shown in the upper graph of FIG. 4, the secondary layer 13 is irradiated with ultraviolet light in a broad wavelength range from the high-pressure mercury lamp or the like. Also, as shown in the lower graph of FIG. 4, the inner primary layer 12 is mainly irradiated with ultraviolet light in a high wavelength range since the outer secondary layer 13 mainly absorbs ultraviolet light in a low wavelength range. However, since the ultraviolet light from the high-pressure mercury lamp or the like is distributed in a broad wavelength range, a large amount of ultraviolet light reaches the primary layer 12 even after the absorption by the secondary layer 13. Thus, the primary layer 12 can be sufficiently cured.

On the other hand, when an ultraviolet semiconductor light emitting element is used as an ultraviolet light source, as in the coated optical fiber manufacturing apparatus described in Patent Documents 1 and 2, for curing the primary layer 12 and the secondary layer 13 all at once after application thereof particularly in the Wet-on-Wet method, both of the primary layer 12 and the secondary layer 13 cannot sometimes be sufficiently cured since the ultraviolet semiconductor light emitting element only emits ultraviolet light of a single wavelength (narrow wavelength range).

To be more specific, the secondary layer cannot exert the same level of elastic modulus as that in the conventional technology if the ultraviolet curable resin used for the secondary layer does not contain a photopolymerization initiator corresponding to the light source wavelength (365 nm to 405 nm) of the ultraviolet semiconductor light emitting element.

Figure 5:
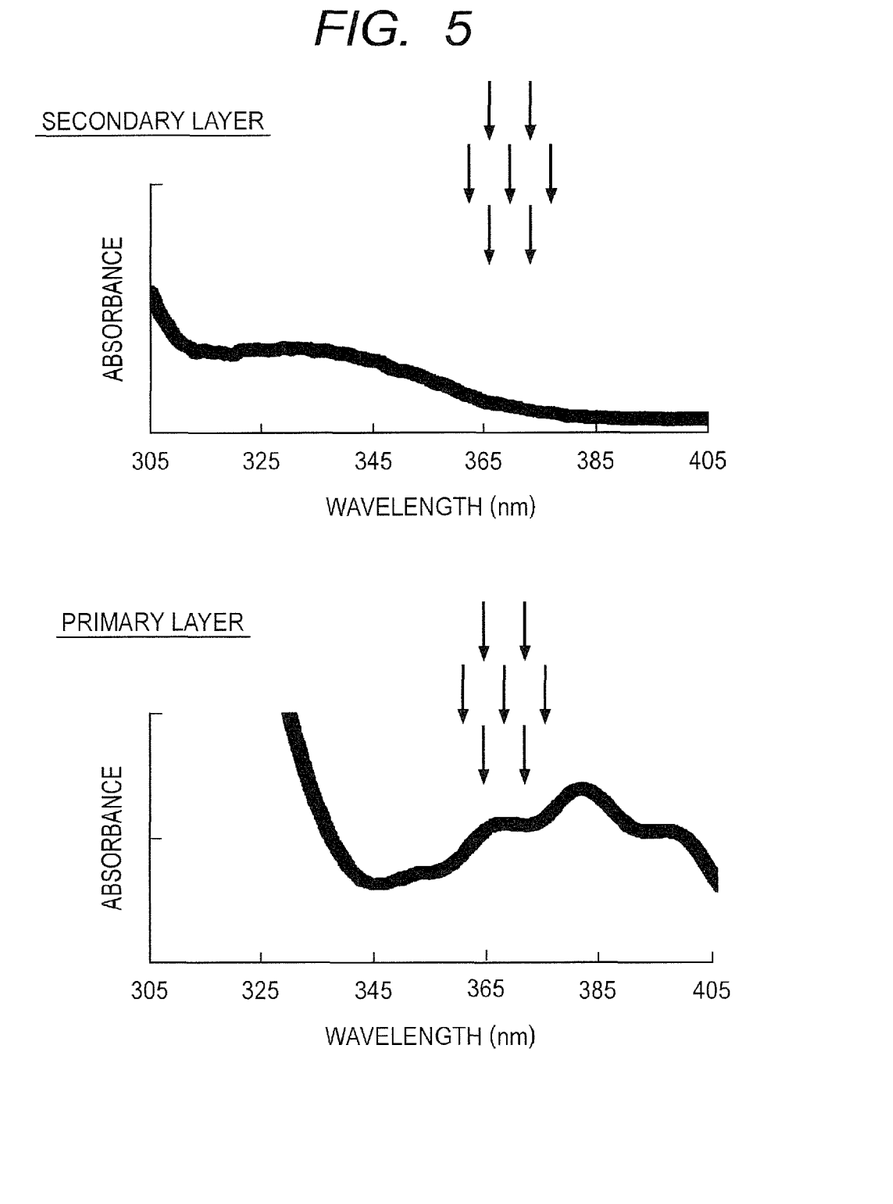
FIG. 5 is a view showing graphs schematically illustrating changes in amount of ultraviolet light from an ultraviolet semiconductor light emitting element.

FIG. 5 is a view showing graphs schematically illustrating changes in amount of light when irradiating the ultraviolet curable resin with ultraviolet light from an ultraviolet semiconductor light emitting element. The ultraviolet curable resin in FIG. 5 is obtained by combining the secondary layer 13 which does not contain the photopolymerization initiator corresponding to the wavelength range of the ultraviolet light from the ultraviolet semiconductor light emitting element with the same primary layer 12 as that in FIG. 4. Information represented in the graphs of FIG. 5 has the same definitions as those in the graphs of FIG. 4.

As shown in the upper graph of FIG. 5, the secondary layer 13 is irradiated with ultraviolet light in a narrow wavelength range from the ultraviolet semiconductor light emitting element. As can be seen from the upper graph of FIG. 5, the outer secondary layer 13 does not contain the photopolymerization initiator corresponding to the wavelength range of the ultraviolet light from the ultraviolet semiconductor light emitting element, and thus does not absorb much ultraviolet light. Therefore, as shown in the lower graph of FIG. 5, the inner primary layer 12 is irradiated with a large amount of ultraviolet light. As a result, the primary layer 12 is cured, but the secondary layer 13 is not sufficiently cured.

Meanwhile, if the ultraviolet curable resin used for the secondary layer 13 contains the photopolymerization initiator corresponding to the wavelength range of the ultraviolet light from the ultraviolet semiconductor light emitting element, as in the coated optical fiber manufacturing apparatus described in Patent Document 2, sufficient light is not transmitted to the primary layer 12, and thus only the secondary layer 13 is cured. As a result, the curability of the primary layer 12 may be reduced.

Figure 6:
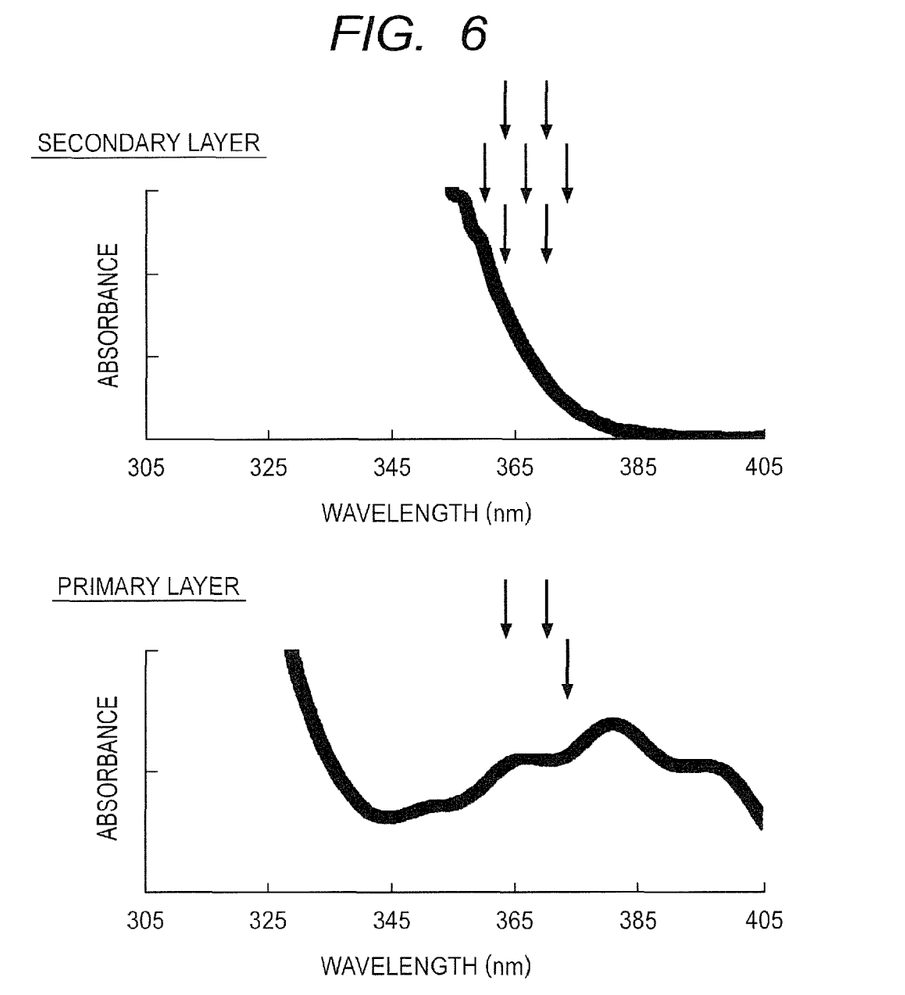
FIG. 6 is a view showing graphs schematically illustrating changes in amount of ultraviolet light from the ultraviolet semiconductor light emitting element.

FIG. 6 is a view showing graphs schematically illustrating changes in amount of light when irradiating the ultraviolet curable resin with ultraviolet light from an ultraviolet semiconductor light emitting element. The ultraviolet curable resin in FIG. 6 is obtained by combining the secondary layer 13 containing the photopolymerization initiator corresponding to the wavelength range of the ultraviolet light from the ultraviolet semiconductor light emitting element with the same primary layer 12 as that in FIG. 4. Information represented in the graphs of FIG. 6 has the same definitions as those in the graphs of FIG. 4.

As shown in the upper graph of FIG. 6, the secondary layer 13 is irradiated with ultraviolet light in a narrow wavelength range from the ultraviolet semiconductor light emitting element. As can be seen from the upper graph of FIG. 6, the outer secondary layer 13 contains the photopolymerization initiator corresponding to the wavelength range of the ultraviolet light from the ultraviolet semiconductor light emitting element, and thus absorbs a large amount of ultraviolet light. Therefore, as shown in the lower graph of FIG. 6, the amount of ultraviolet light irradiated to the inner primary layer 12 is significantly reduced. As a result, the secondary layer 13 is cured, but the primary layer 12 is not sufficiently cured.

More specifically, as can be seen from FIG. 6, it is difficult to sufficiently cure both of the primary layer 12 and the secondary layer 13 even if the ultraviolet curable resin simply contains the photopolymerization initiator corresponding to the wavelength range of the ultraviolet light from the ultraviolet semiconductor light emitting element.

On the other hand, in the optical fiber coating resin according to this embodiment, the photopolymerization initiator contained in the ultraviolet curable resin used for the secondary layer 13 is configured to generate radicals by absorbing light in a wavelength range (350 nm to 405 nm in this embodiment) emitted from the light source of the ultraviolet semiconductor light emitting element, and to have photobleaching properties, in order for the primary layer 12 and the secondary layer 13 to achieve sufficient curability even with the Wet-on-Wet method. The photopolymerization initiator contained in the primary layer 12 absorbs light in the wavelength range (350 nm to 405 nm in this embodiment), which is the same as or approximate to that of the secondary layer 13.

Here, photobleaching, also described as photofading and photodecolorization, is one of the environmental effects, referring to a photochemical property rarely found in an excited fluorescent molecule. This reaction occurs since a fluorescent substance in an excited state is chemically activated and becomes unstable compared with a ground state. As a result of this reaction, the fluorescent molecule eventually turns into a low fluorescent structure. In the invention according to this embodiment, when the photopolymerization initiator absorbs light in a certain ultraviolet range and thus generates radicals to initiate polymerization of the ultraviolet curable resin, reduction in absorbance in that ultraviolet range due to disconnection of a conjugated bond between molecules in the photopolymerization initiator after the generation of the radicals is referred to as the photobleaching. As a result, the light in the ultraviolet range can be transmitted to the inside. Thus, even a thick film can be smoothly cured. Therefore, the primary layer 12 on the inside of the secondary layer 13 can be sufficiently cured.

Figure 7:
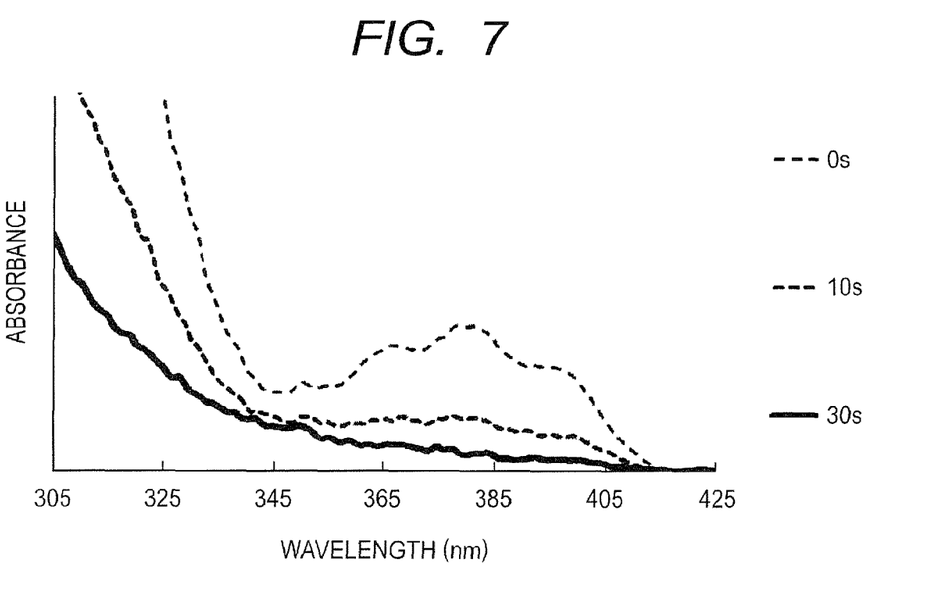
FIG. 7 is a view showing graphs schematically illustrating changes in absorbance of ultraviolet curable resin containing a photopolymerization initiator with photobleaching properties.

FIG. 7 is a view showing graphs schematically illustrating changes in absorbance during ultraviolet irradiation on ultraviolet curable resin containing a photopolymerization initiator with photobleaching properties. FIG. 7 shows graphs of absorbance 0 seconds, 10 seconds, and 30 seconds after the start of the ultraviolet irradiation on 100 μm thick ultraviolet curable resin containing a photopolymerization initiator with photobleaching properties. As can be seen from FIG. 7, while the absorbance is high particularly in the wavelength range of 350 nm to 405 nm immediately after (0 seconds after) the ultraviolet irradiation, the absorbance in that wavelength range is significantly reduced 10 seconds and 30 seconds after the start of the ultraviolet irradiation. In this embodiment, with the use of the photopolymerization initiator having such photobleaching properties, the secondary layer 13 can be cured and, at the same time, the primary layer 12 on the inside of the secondary layer 13 can be supplied with a sufficient amount of ultraviolet light and thus cured.

Note that, although the 100 μm thick ultraviolet curable resin is used in FIG. 7, the secondary layer 13 in an actual optical fiber has a thickness of about 10 μm to 50 μm. Thus, the photobleaching properties are exerted in a much shorter time than that shown in FIG 7. Therefore, the primary layer 12 and the secondary layer 13 can be cured within a time period for the optical fiber to pass through the ultraviolet irradiation unit 26a in FIG. 2.

Figure 8:
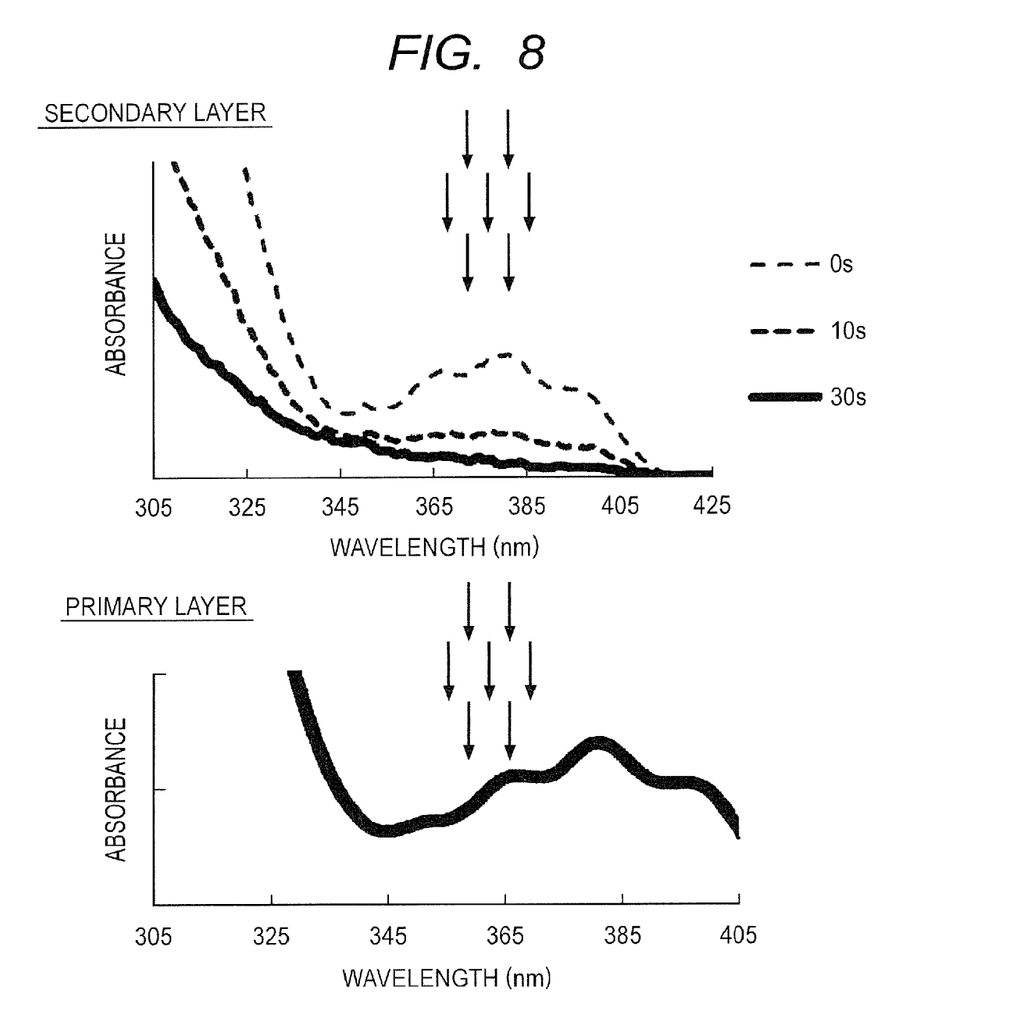
FIG. 8 is a view showing graphs schematically illustrating changes in amount of ultraviolet light from the ultraviolet semiconductor light emitting element.

FIG. 8 is a view showing graphs schematically illustrating changes in amount of light when irradiating the ultraviolet curable resin with ultraviolet light from an ultraviolet semiconductor light emitting element. The ultraviolet curable resin in FIG. 8 is obtained by combining the secondary layer 13 containing a photopolymerization initiator corresponding to the wavelength range of the ultraviolet light from the ultraviolet semiconductor light emitting element and having the photobleaching properties with the same primary layer 12 as that in FIG. 4. Information represented in the graphs of FIG. 8 has the same definitions as those in the graphs of FIG. 4. Moreover, the upper graphs of FIG. 8 represent the absorbance 0 seconds, 10 seconds, and 30 seconds after the start of the ultraviolet irradiation.

As shown in the upper graphs of FIG. 8, the secondary layer 13 is irradiated with ultraviolet light in a narrow wavelength range from the ultraviolet semiconductor light emitting element. As can be seen from the upper graphs of FIG. 8, the photopolymerization initiator contained in the secondary layer 13 has the photobleaching properties, and thus the absorbance of the secondary layer 13 lowers with time (that is, with progression of curing). Therefore, as shown in the lower graph of FIG. 8, the inner primary layer 12 is irradiated with a large amount of ultraviolet light after the elapse of a predetermined period of time. As a result, the primary layer 12 and the secondary layer 13 can be both sufficiently cured.

As the photopolymerization initiator with the photobleaching properties, an acylphosphine oxide initiator can be used. For example, 2, 4, 6-trimethylbenzoyl diphenylphosphine oxide (trade name: Lucirin (registered trademark, hereinafter omitted) TPO, BASF (registered trademark, hereinafter omitted) Japan Ltd.), ethyl (2, 4, 6-trimethylbenzoyl)-phenylphosphinate (trade name: Lucirin TPO-L, BASF Japan Ltd.), bis(2, 4, 6-trimethylbenzoyl)-phenylphosphine oxide (trade name: Irgacure (registered trademark, hereinafter omitted) 819, Irgacure 819 DW, BASF Japan Ltd.), bis(2, 6-dimethoxybenzoyl)-2, 4, 4-trimethyl-pentylphosphine oxide (trade name: Irgacure 1700, BASF Japan Ltd.), and the like can be used. Furthermore, as commercialized products, Irgacure 2100, Darocur 4265, Irgacure 2022 (all by BASF Japan Ltd.), and the like can be used.

Moreover, as the photopolymerization initiator with the photobleaching properties, 1-[4-(phenylthio)phenyl]-1,2-octanedione 2-(o-benzoyloxime) (trade name: Irgacure OXE01, BASF Japan Ltd.) that is an O-acyloxime initiator can be used.

In the invention according to this embodiment, two kinds or more of the photopolymerization initiators may be used in combination. In this case, it is preferable that at least one of the acylphosphine oxide photopolymerization initiator and O-acyloxime photopolymerization initiator described above is combined with an α-hydroxyalkylphenon photopolymerization initiator. Such a combination of photopolymerization initiators can improve surface curability. Particularly, a combination of at least one of the acylphosphine oxide photopolymerization initiator and the O-acyloxime photopolymerization initiator with the α-hydroxyalkylphenon photopolymerization initiator, which have absorption peaks at different wavelengths, can further improve the surface curability.

The amount of the photopolymerization initiators with the photobleaching properties to be added is preferably 10 wt % or less of the ultraviolet curable resin used for the secondary layer 13. If the amount of the photopolymerization initiators is more than 10 wt %, sufficient light may not reach the primary layer 12 or the secondary layer 13 may be colored.

Moreover, in order to achieve sufficient curability of the primary layer 12, it is preferable that the photopolymerization initiator used in this embodiment has photobleaching properties such that the absorbance value of the ultraviolet curable resin containing the photopolymerization initiator at 365 nm when cured with ultraviolet irradiation of 200 mJ is 80% or less, more preferably 50% or less of the absorbance value before curing.

In this embodiment, the fact that the primary layer 12 has sufficient curability means a state where the primary layer 12 has an elastic modulus of 0.2 MPa or more, and more preferably 0.3 MPa or more after cured. Likewise, the fact that the secondary layer 13 has sufficient curability means a state where the secondary layer 13 has an elastic modulus of 500 MPa or more, and more preferably 800 MPa or more after cured.

Note that, in order for the coated optical fiber 10 to maintain its characteristics and functions, the elastic modulus of the primary layer 12 after cured is preferably 0.2 MPa or more but 3.0 MPa or less, and more preferably 0.3 MPa or more but 1.5 MPa or less. Moreover, the elastic modulus of the secondary layer 13 after cured is preferably 500 MPa or more but 2500 MPa or less, and more preferably 800 MPa or more but 2200 MPa or less.

In the invention according to this embodiment, the absorption wavelength of the photopolymerization initiator used for the secondary layer 13 corresponds to the wavelength range of the ultraviolet light outputted by the ultraviolet semiconductor light emitting element, and the photopolymerization initiator has the photobleaching properties. More specifically, the secondary layer 13 contains the photopolymerization initiator, which generates radicals by absorbing light in a wavelength range (to be more specific, 350 nm to 405 nm) emitted from the ultraviolet semiconductor light emitting element, and which has the photobleaching properties.

In the invention according to this embodiment, even when a semiconductor light emitting element that outputs ultraviolet light of a single wavelength or a very narrow wavelength range is used as a light source, the primary layer 12 and the secondary layer 13 can be both sufficiently cured by allowing the secondary layer 13 to contain the photopolymerization initiator having the predetermined properties described above. Moreover, a manufacturing apparatus can be configured at low cost since a single kind of semiconductor light emitting element can be used, which is generally easily available.

EXAMPLE

A sample is prepared in a simulated state where a primary layer 12 and a secondary layer 13 are formed on a glass optical fiber, and then curability (elastic modulus) thereof is measured. Two quartz glasses are prepared, and one quartz glass 101 is spin coated with primary ultraviolet curable resin (100 μm) and the other quartz glass 103 is spin coated with secondary ultraviolet curable resin (50 μm).

Figure 3:
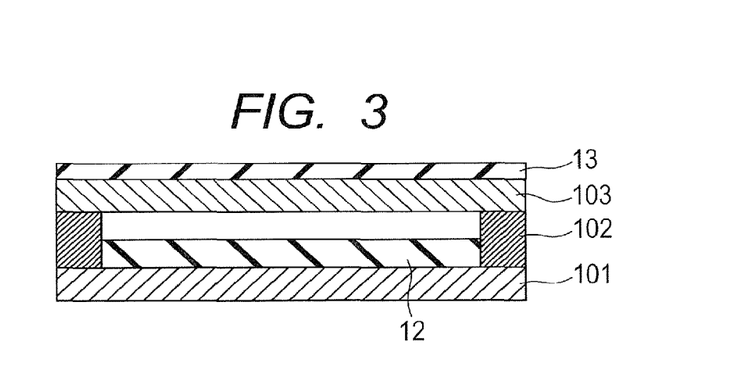
FIG. 3 is a schematic cross-sectional view showing a sample of an example according to the embodiment of the present invention.

As shown in FIG. 3, a sample is obtained by providing a spacer 102 (1 mm in thickness) on the quartz glass 101 with the primary ultraviolet curable resin applied thereto and then placing thereon the quartz glass 103 with the secondary ultraviolet curable resin applied thereto.

The reason for providing the spacer as described above is to prevent the primary ultraviolet curable resin from breaking during removal by adhering to the quartz glass with the secondary ultraviolet curable resin applied thereto.

The prepared sample is put in a purge box and set in a nitrogen atmosphere, and is then irradiated with ultraviolet light (365 nm) after illumination and speed are adjusted to obtain a predetermined cumulative amount of light in a conveyor-type ultraviolet irradiation device, thereby curing the resins.

Films thus obtained, which are made of the primary ultraviolet curable resin (primary layer 12) and the secondary ultraviolet curable resin (secondary layer 13), respectively, are peeled off the glass base materials and cut into a 6 mm wide strip shape. Then, 2.5% modulus (elastic modulus) thereof is measured according to JIS K 7161. As a result of the measurement, Table 1 shows a relationship between the kind of the photopolymerization initiator, the kind of the light source, and the curability of the primary layer 12 and the secondary layer 13.

Here, a photopolymerization initiator that absorbs light of 365 nm or more is used for the primary ultraviolet curable resin. Also, the following photopolymerization initiators manufactured by BASF Japan Ltd. are used as the initiator for the secondary ultraviolet curable resin.

No. 1 and No. 2: Irgacure 184 (IC 184)
No. 3: Irgacure 369 (IC 369)
No. 4: Irgacure 379 (IC 379)
No. 5: Lucirin TPO (TPO)
No. 6: Irgacure 819 (IC 819)
No. 7: Irgacure OXE01 (OXE01)
No. 8: Irgacure OXE02 (OXE02)
No. 9: OXE01 and IC 184

As described above, Lucirin TPO, Irgacure 819, and Irgacure OXE01 are photopolymerization initiators with photobleaching properties, and the others are photopolymerization initiators without the photobleaching properties.

Moreover, in Table 1, D-bulb means a high-pressure mercury lamp and 365 nm LED means an ultraviolet semiconductor light emitting element with a center light source wavelength of 365 nm.

Furthermore, as for determination, ○ means when the elastic modulus of the secondary layer 13 is 500 MPa or more and the elastic modulus of the primary layer 12 is 0.2 MPa or more, at which the coated optical fiber can maintain its characteristics and functions.

TABLE 1

| No. | Initiator for Secondary Layer | Presence of Photobleaching Properties | Light Source | Elastic Modulus of Secondary Layer (Mpa) | Elastic Modulus of Primary Layer (Mpa) | Determination |
|---|---|---|---|---|---|---|
| 1 | IC 184 | No | D-bulb | 1000 | 1.4 | ○ |
| 2 | IC 184 | No | 365 nm LED | 450 | 1.1 | x |
| 3 | IC 369 | No | 365 nm LED | 740 | 0.1 | x |
| 4 | IC 379 | No | 365 nm LED | 730 | 0.08 | x |
| 5 | TPO | Yes | 365 nm LED | 880 | 1.1 | ○ |
| 6 | 819 | Yes | 365 nm LED | 867 | 1.0 | ○ |
| 7 | OXE01 | Yes | 365 nm LED | 960 | 1.0 | ○ |
| 8 | OXE02 | No | 365 nm LED | 1000 | 0.05 | x |
| 9 | OXE01 IC 184 | Yes | 365 nm LED | 1020 | 0.8 | ○ |

In No. 1, D-bulb that is the high-pressure mercury lamp is used as the light source, and the secondary layer 13 and the primary layer 12 are both sufficiently cured. However, when the ultraviolet semiconductor light emitting element is used as the light source and the photopolymerization initiator that does not absorb much ultraviolet light of the light source wavelength from the ultraviolet semiconductor light emitting element is used as in No. 2, the elastic modulus of the secondary layer 13 is less than 500 MPa, leading to insufficient curing.

On the other hand, when the absorption wavelength of the photopolymerization initiator in the secondary layer 13 corresponds to the light source wavelength of the ultraviolet semiconductor light emitting element as in Nos. 3 and 4, the light of the absorption wavelength of the photopolymerization initiator in the secondary layer 13 does not reach the primary layer 12, and thus the elastic modulus of the primary layer 12 is less than 0.2 MPa, leading to insufficient curing.

The photopolymerization initiators used for the secondary layer 13 in Nos. 5, 6, and 7 have the absorption wavelength corresponding to the light source wavelength of the ultraviolet semiconductor light emitting element, and have the photobleaching properties. The use of such photopolymerization initiators result in the secondary layer 13 having the elastic modulus of 500 MPa or more and the primary layer 12 having the elastic modulus of 0.2 MPa or more. Thus, the secondary layer 13 and the primary layer 12 both exhibit good curability. Particularly, in No. 7, the secondary layer 13 has high curability.

The photopolymerization initiator used in No. 8 mainly absorbs the light source wavelength of the ultraviolet semiconductor light emitting element, but has no photobleaching properties. Therefore, despite the excellent curability of the secondary layer 13, the ultraviolet light does not reach the inside due to the absence of the photobleaching properties. As a result, the elastic modulus of the primary layer 12 is less than 0.2 MPa, leading to insufficient curing. The secondary layer 13 using this photopolymerization initiator is suitable for a Wet-on-Dry method using the ultraviolet semiconductor light emitting element as the light source.

In No. 9, the photopolymerization initiator which has the absorption wavelength corresponding to the light source wavelength of the ultraviolet semiconductor light emitting element, and which has the photobleaching properties as well as the photopolymerization initiator excellent in surface curability with no absorption peak in the light source wavelength range of the ultraviolet semiconductor light emitting element are both used for the secondary layer 13. In this case, the elastic modulus of the secondary layer 13 is 500 MPa or more and the elastic modulus of the primary layer 12 is 0.2 MPa or more. Thus, the secondary layer 13 and the primary layer 12 both exhibit good curability, and good surface curability is achieved.

The present invention achieves an effect that an optical fiber including a coating resin with a high elastic modulus can be obtained even when a coated optical fiber is manufactured using an ultraviolet semiconductor light emitting element as a light source for curing resin and using the Wet-on-Wet method.

The present invention is not limited to the above example, but changes may be made without departing from the spirit of the present invention.

The invention claimed is:

1. A method for manufacturing a coated optical fiber including a glass optical fiber, a primary layer covering the glass optical fiber, and a secondary layer covering the primary layer, comprising the steps of:
    applying a first ultraviolet curable resin to the glass optical fiber:
    applying a second ultraviolet curable resin to the periphery of the first ultraviolet curable resin before curing the first ultraviolet curable resin; and
    forming the primary layer and the secondary layer by irradiating the first ultraviolet curable resin and the second ultraviolet curable resin with light in a wavelength range of 350 nm to 405 nm emitted from an ultraviolet semiconductor light emitting element, wherein the second ultraviolet curable resin contains a photopolymerization initiator that absorbs the light from the ultraviolet semiconductor light emitting element to generate radicals, and the photopolymerization initiator includes an O-acyloxime initiator having photobleaching properties and an α-hydroxyalkylphenon photopolymerization initiator.

2. The method for manufacturing a coated optical fiber, according to claim 1, wherein
the ultraviolet semiconductor light emitting element is one of a light emitting diode and a semiconductor laser.

3. The method for manufacturing a coated optical fiber, according to claim 1, wherein
the primary layer has an elastic modulus of 0.2 MPa or more but 3.0 MPa or less, and
the secondary layer has an elastic modulus of 500 MPa or more but 2500 MPa or less.

4. A coated optical fiber comprising:
a glass optical fiber;
a primary layer covering the glass optical fiber; and
a secondary layer covering the primary layer, wherein
the secondary layer is formed by irradiating ultraviolet curable resin with light in a wavelength range of 350 nm to 405 nm emitted from an ultraviolet semiconductor light emitting element, the ultraviolet curable resin containing a photopolymerization initiator that absorbs the light from the ultraviolet semiconductor light emitting element to generate radicals,
the photopolymerization initiator includes an O-acyloxime initiator having photobleaching properties and an α-hydroxyalkylphenon photopolymerization initiator,
the primary layer has an elastic modulus of 0.2 MPa or more but 3.0 MPa or less, and
the secondary layer has an elastic modulus of 500 MPa or more but 2500 MPa or less.

5. The coated optical fiber according to claim 4, wherein
the ultraviolet semiconductor light emitting element is one of a light emitting diode and a semiconductor laser.

* * * * *